(12) United States Patent
Decker et al.

(10) Patent No.: US 10,037,574 B2
(45) Date of Patent: Jul. 31, 2018

(54) SYSTEMS AND METHODS TO DISPLAY CHART BARS WITH VARIABLE SCALING AND/OR AGGREGATION

(71) Applicant: TRADING TECHNOLOGIES INTERNATIONAL INC., Chicago, IL (US)

(72) Inventors: Stephen P. Decker, Naperville, IL (US); Christopher J. Figy, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 376 days.

(21) Appl. No.: 14/698,628

(22) Filed: Apr. 28, 2015

(65) Prior Publication Data
US 2016/0321747 A1    Nov. 3, 2016

(51) Int. Cl.
*G06Q 40/04*    (2012.01)
(52) U.S. Cl.
CPC .................. *G06Q 40/04* (2013.01)
(58) Field of Classification Search
CPC ..................................................... G06Q 40/04
USPC ......................................................... 705/37
See application file for complete search history.

(56) References Cited

U.S. PATENT DOCUMENTS

| | | | |
|---|---|---|---|
| 4,190,641 A | 2/1980 | Preston, Jr. | |
| 5,228,119 A | 7/1993 | Mihalisin et al. | |
| 5,297,032 A | 3/1994 | Trojan et al. | |
| 5,347,452 A | 9/1994 | Bay, Jr. | |
| 5,454,104 A | 9/1995 | Steidlmayer et al. | |
| 5,463,731 A | 10/1995 | Diec et al. | |
| 5,684,507 A | 11/1997 | Rasnake et al. | |
| 5,684,508 A | 11/1997 | Brilman | |

(Continued)

FOREIGN PATENT DOCUMENTS

| | | |
|---|---|---|
| JP | 6301682 A | 10/1994 |
| JP | 2002240949 A | 8/2002 |
| JP | 2003140719 A | 5/2003 |

OTHER PUBLICATIONS

About 2-Dimensional Plot (No. 6) Webpage [online], t16web.lanl.gov, Aug. 26, 2003, [Retrieved on Mar. 6, 2006] from the Internet: http://t16web.lanl.gov/Kawano/gnuplot/plot6-e.html.

(Continued)

*Primary Examiner* — Jagdish Patel
(74) *Attorney, Agent, or Firm* — McDonnell Boehnen Hulbert & Berghoff LLP

(57) ABSTRACT

Example methods, apparatus, and computer readable storage media are described and disclosed. An example method includes receiving market data related to a tradeable object offered at an exchange, aggregating a first data subset of the market data for a first period, and aggregating a second data subset of the market data for a second period. The second period represents a period of time different from the first period. The example method includes defining a first bar based on the first data subset and a first bar-width, and defining a second bar based on the second data subset and a second bar-width. The second bar-width is related to the first bar-width based on a width-scaling factor. The example method includes displaying the first bar and the second bar in the window, wherein the first bar and the second bar are separated by a bar-spacing.

16 Claims, 12 Drawing Sheets

(56) References Cited

U.S. PATENT DOCUMENTS

| | | |
|---|---|---|
| 5,912,656 A | 6/1999 | Tham et al. |
| 5,924,082 A | 7/1999 | Silverman et al. |
| 6,064,401 A | 5/2000 | Holzman et al. |
| 6,085,202 A | 7/2000 | Rao et al. |
| 6,175,832 B1 | 1/2001 | Luzzi et al. |
| 6,195,647 B1 | 2/2001 | Martyn et al. |
| 6,219,052 B1 | 4/2001 | Gould |
| 6,271,863 B1 | 8/2001 | Bose et al. |
| 6,278,982 B1 | 8/2001 | Korhammer et al. |
| 6,380,953 B1 | 4/2002 | Mizuno |
| 6,418,419 B1 | 7/2002 | Nieboer et al. |
| 6,470,295 B1 | 10/2002 | Mirow et al. |
| 6,519,227 B1 * | 2/2003 | Koizumi ............. H04B 1/707 370/241 |
| 6,618,707 B1 | 9/2003 | Gary |
| 6,628,312 B1 | 9/2003 | Rao et al. |
| 6,944,818 B2 | 9/2005 | Newman et al. |
| 6,993,504 B1 | 1/2006 | Friesen et al. |
| 7,212,208 B2 | 5/2007 | Khozai |
| 7,218,325 B1 | 5/2007 | Buck |
| 7,292,245 B2 | 11/2007 | Goggin |
| 7,348,981 B1 | 3/2008 | Buck |
| 7,356,501 B2 | 4/2008 | Churquina |
| 7,384,987 B2 | 6/2008 | Iordache-Cazana et al. |
| 7,389,268 B1 | 6/2008 | Kemp, II et al. |
| 7,418,422 B2 | 8/2008 | Burns |
| 7,428,506 B2 | 9/2008 | Waelbroeck et al. |
| 7,523,064 B2 | 4/2009 | Burns et al. |
| 7,562,047 B2 | 7/2009 | Friesen et al. |
| 7,571,134 B1 | 8/2009 | Burns et al. |
| 7,574,397 B1 | 8/2009 | Kline et al. |
| 7,590,587 B2 | 9/2009 | Duquette |
| 7,593,887 B2 | 9/2009 | Duquette |
| 7,620,587 B2 | 11/2009 | Duquette |
| 7,629,975 B2 | 12/2009 | Buck |
| 7,680,721 B2 | 3/2010 | Cutler |
| 7,711,630 B2 | 5/2010 | O'Connor et al. |
| 7,965,292 B2 | 6/2011 | Buck |
| 8,044,959 B2 | 10/2011 | Buck |
| 8,131,618 B2 | 3/2012 | Weinstein |
| 8,145,558 B2 | 3/2012 | Duquette |
| 8,150,760 B2 | 4/2012 | Duquette |
| 8,150,761 B2 | 4/2012 | Duquette |
| 8,269,774 B2 | 9/2012 | Buck |
| 8,395,625 B2 | 3/2013 | Buck |
| 8,494,941 B2 | 7/2013 | Aymeloglu et al. |
| 8,537,161 B2 | 9/2013 | Buck |
| 9,189,874 B2 | 11/2015 | Buck |
| 9,542,709 B2 | 1/2017 | Buck |
| 9,734,535 B2 | 8/2017 | Burns et al. |
| 2002/0007335 A1 | 1/2002 | Millard et al. |
| 2002/0052827 A1 | 5/2002 | Waelbroeck et al. |
| 2002/0161853 A1 | 10/2002 | Burak et al. |
| 2003/0004853 A1 | 1/2003 | Ram et al. |
| 2003/0023542 A1 | 1/2003 | Kemp, II et al. |
| 2003/0069834 A1 | 4/2003 | Cutler |
| 2003/0139989 A1 | 7/2003 | Churquina |
| 2004/0164983 A1 | 8/2004 | Khozai |
| 2005/0162423 A1 | 7/2005 | Goggin |
| 2005/0228735 A1 | 10/2005 | Duquette |
| 2005/0234799 A1 | 10/2005 | Hansen et al. |
| 2006/0265317 A1 | 11/2006 | Duquette |
| 2006/0265320 A1 | 11/2006 | Duquette |
| 2009/0292650 A1 | 11/2009 | Duquette |
| 2009/0292651 A1 | 11/2009 | Duquette |
| 2009/0292652 A1 | 11/2009 | Duquette |
| 2009/0307127 A1 | 12/2009 | Burns et al. |
| 2009/0319441 A1 | 12/2009 | Duquette |
| 2010/0039432 A1 | 2/2010 | Buck |
| 2010/0332379 A1 | 12/2010 | Ram et al. |
| 2011/0210974 A1 | 9/2011 | Buck |
| 2011/0251942 A1 | 10/2011 | Rosenthal et al. |
| 2012/0005045 A1 * | 1/2012 | Baker ............. G06Q 30/0643 705/27.2 |
| 2012/0007868 A1 | 1/2012 | Buck |
| 2012/0306888 A1 | 12/2012 | Buck |
| 2013/0147807 A1 | 6/2013 | Buck |
| 2014/0184609 A1 | 7/2014 | Buck |
| 2014/0279345 A1 | 9/2014 | Burns et al. |
| 2016/0035030 A1 | 2/2016 | Buck |
| 2017/0084063 A1 | 3/2017 | Buck |

OTHER PUBLICATIONS

BrainTrading Solutions—Intelligent Trading Solutions Website [online], BrainTrading Solutions, Jul. 21, 2001, [Retrieved on Mar. 17, 2006] from the Internet: http://www.braintrading.com.

Erroneous Temperature vs Time Graph [online], www.astro.ucla.edu, Nov. 28, 1997, [Retrieved on Jul. 6, 2007] from the Internet: http://www.astro.ucla.edu/~wright/tvtmrrs2.html.

International Search Report of International Application No. PCT/US2003/018436, dated Jan. 3, 2004 (mailed Jan. 13, 2004).

International Search Report of International Application No. PCT/US2014/016623, dated Jun. 28, 2014 (mailed Jul. 9, 2014).

Pstock Webpages [online], www.pstock.com, Aug. 1, 2001.

Tufte, E.R., The Visual Display of Quantitative Information, Cheshire, Connecticut: Graphics Press, 1983, pp. 60-71.

* cited by examiner

SET VARIABLE DISPLAY SCALING FACTORS

MUST BE GREATER THAN 0
SET SCALING FACTOR < 1 TO DECREASE VALUES
SET SCALING FACTOR = 1 FOR DEFAULT SETTINGS
SET SCALING FACTOR > 1 TO INCREASE VALUES

WIDTH SCALING FACTOR:   WSF = __1__
(1 = 10 PIXELS)

SPATIAL SCALING FACTOR:   SSF = __1__
(1 = 15 PIXELS)

AGGREGATION SCALING FACTOR:   ASF = __1__
(1 = 1 MINUTE)

USE EQUATION TO SET SCALING FACTOR(S) _____

SET AGGREGATION UNITS
FOR AGGREGATION SCALING FACTOR = 1

TIME
● MINUTES    ○ HOURS    ○ DAYS    ○ OTHER

VOLUME (NUMBER OF CONTRACTS)
○ 10    ○ 100    ○ 1,000    ○ OTHER

PRICE
○ $10    ○ $100    ○ $1,000    ○ OTHER

TICKS
○ 1    ○ 5    ○ 10    ○ OTHER

FIG. 5

SYSTEMS AND METHODS TO DISPLAY CHART BARS WITH VARIABLE SCALING AND/OR AGGREGATION

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Trading applications create interactive trading interfaces for traders to view and/or participate in at least one market offered at the electronic exchange. The trading interfaces enable traders to monitor the market data for the electronic exchange (e.g., monitor positions, obtain market quotes, etc.) and submit trade orders to the electronic exchange. To assist traders in obtaining the best prices for their trade orders, a large volume of trade information such as market data is presented to the trader for analysis and/or assimilation. Some trading interfaces display market data using charts to enable the trader to better understand a relationship between movement of price and volume of trades of a tradeable object. Charts graphically represent the market data and enable the trader to visualize trends and/or changes in data over intervals (e.g., time) of interest.

BRIEF DESCRIPTION OF THE FIGURES

Certain examples are disclosed with reference to the following drawings.

FIG. 5 illustrates an example graphical user interface in which scaling factors for the variable display of FIG. 4 may be selected.

Figure 1:
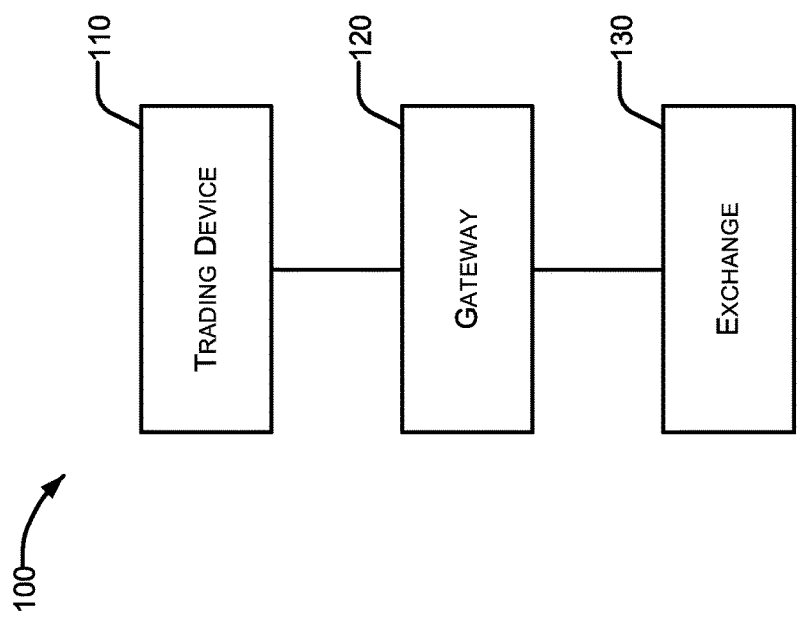
FIG. 1 illustrates a block diagram representative of an example electronic trading system in which certain examples may be employed.

Certain examples will be better understood when read in conjunction with the provided figures, which illustrate examples. It should be understood, however, that the examples are not limited to the arrangements and instrumentality shown in the attached figures.

DETAILED DESCRIPTION

This patent relates generally to electronic trading and, more particularly, to methods to display chart bars with variable scaling and/or aggregation.

The examples disclosed and described herein enable a user to better understand a relationship between movement of price and/or volume of trades of a tradeable object using a graphical representation of a set of data (e.g., market data associated with the tradeable object). The graphical representation may include a chart such as a bar chart, a candlestick chart, an OHLC (open-high-low-close) chart, a timeline chart, etc. In some such instances, the market data is aggregated into "rolled-up" bars. For example, the bars may be aggregated by time (e.g., five minute bars, 30 minute bars, daily bars, etc.), by volume (e.g., 40 contracts, 1,000 contracts, etc.) by ticks (e.g., the number of data points) and/or by price.

Regardless of the display style (e.g., a bar chart, a candlestick chart, an OHLC chart, a timeline chart, etc.), a trader usually has limited options available for viewing more or less data. For example, the trader can select different aggregation parameters (e.g., one minute bars to see a close-in, detailed view, or switch to longer aggregation periods (e.g., hourly, daily, etc.) to see more historical data). However, viewing the additional data typically comes at the cost of a diminished viewing experience as detailed information associated with the bars becomes relatively harder to identify.

The examples disclosed and described herein chart market data for a tradeable object in a variable display. In some examples, the variable display includes tradeable object bars, where each tradeable object bar represents an aggregation of market data for a tradeable object. For example, one or more attributes of the tradeable object may define graphical characteristics (e.g., height, width, location, etc.) of the tradeable object bar. As a result, the tradeable object bars may graphically represent the attributes and enable comparison of the associated tradeable object for different aggregations (e.g., identifying trends in trades of the tradeable object).

In some examples, the graphical characteristics of the tradeable object bars are variably changed. For example, a sliding scale may be applied to the spacing between consecutive tradeable object bars, the width of each tradeable object bar and/or the aggregation parameters. For example, in a variable display for time-series data, the tradeable object bars representative of the most recent market data may have a "normal" appearance (e.g., a non-squeezed view), while the spacing between tradeable object bars and/or the width of the tradeable object bars representative of historical data have a squeezed appearance. That is, the variable display includes a squeezed view of data (e.g., historical data) that transitions to a normal view of data in which the tradeable object bars have increased spacing between consecutive tradeable object bars and increased widths. In some such examples, within the same presentation window, the variable display presents (1) a clear, detailed representation of the most recent market data (e.g., price actions), and (2) a longer term view of swing-highs and swing-lows as the data moves back-in-time. As a result, disclosed and described examples relieve a trader of continuously changing charts, switching between different aggregations and/or using multiple displays with different aggregations.

Although this description discloses examples including, among other components, software executed on hardware, it should be noted that the examples are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain examples may be implemented in other ways.

While some examples described herein may refer to functions performed by one or more given actors such as "users," "traders," "market participants" and/or other entities, it should be understood that this is for purposes of explanation only. The claims should not be interpreted to require action by any such example actor unless explicitly required by the language of the claims themselves.

I. Brief Description of Certain Examples

Certain embodiments provide a method. The example method includes receiving market data related to a tradeable object offered at an exchange. The example method includes aggregating a first data subset of the market data for a first period, and aggregating a second data subset of the market data for a second period. In the example method, the second period represents a period of time different from the first period. The example method includes defining a first bar based on the first data subset and a first bar-width, and defining a second bar based on the second data subset and a second bar-width. In the example method, the second bar-width is related to the first bar-width based on a width-scaling factor. The example method also includes displaying the first bar and the second bar in the window. In the example method, the first bar and the second bar are separated by a bar-spacing.

Certain embodiments provide a tangible computer readable storage medium comprising instructions. The example instructions, when executed, cause a computing device to at least receive market data related to a tradeable object offered at an exchange. The example instructions, when executed, cause the computing device to aggregate a first data subset of the market data for a first period, and aggregate a second data subset of the market data for a second period. The example second period to represent a period of time different from the first period, and a duration associated with the second period to be a duration associated with the first period based on an aggregation-scaling factor greater than one. The example instructions, when executed, cause the computing device to define a first bar based on the first data subset and a first bar-width, and to define a second bar based on the second data subset and a second bar-width. The example second bar-width to be related to the first bar-width based on a width-scaling factor. The example instructions, when executed, cause the computing device to display the first bar and the second bar in the window, wherein the first bar and the second bar are separated by a bar-spacing.

II. Example Electronic Trading System

FIG. 1 illustrates a block diagram representative of an example electronic trading system 100 in which certain examples may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device maybe executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

In some examples, the trading device 110 may include a tradeable object variable display module (sometimes referred to herein as a "variable display module"). The variable display module may include instructions that may be executed in accordance with one or more of the examples disclosed and described herein. For example, a variable display module may include instructions for receiving market data related to a tradeable object and displaying the market data using variable scaling and/or aggregation. For example, the variable display module may include instructions to graphically represent the market data using tradeable object bars. In some such examples, the variable display module may include instructions to variably scale the graphical characteristics of the tradeable object bars for the market data presented. For example, the variable display module may include instructions to decrease the spacing between the tradeable object bars and/or the width of each tradeable object bar when viewing the market data from the most recent information to historical information. In some other examples, the variable display module may include instructions to variably scale the market data aggregated into the "rolled-up" tradeable object bars. For example, the variable display module may include instructions to aggregate current market data over short (e.g., finer or more granular) periods (e.g., 1 minute bars) and over relatively longer periods (e.g., 1 hour bars, daily bars, etc.). In another example, the variable display module may include instructions to variably scale the spacing between the tradeable object bars, the width of each tradeable object bar and/or the market data aggregations.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain examples, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
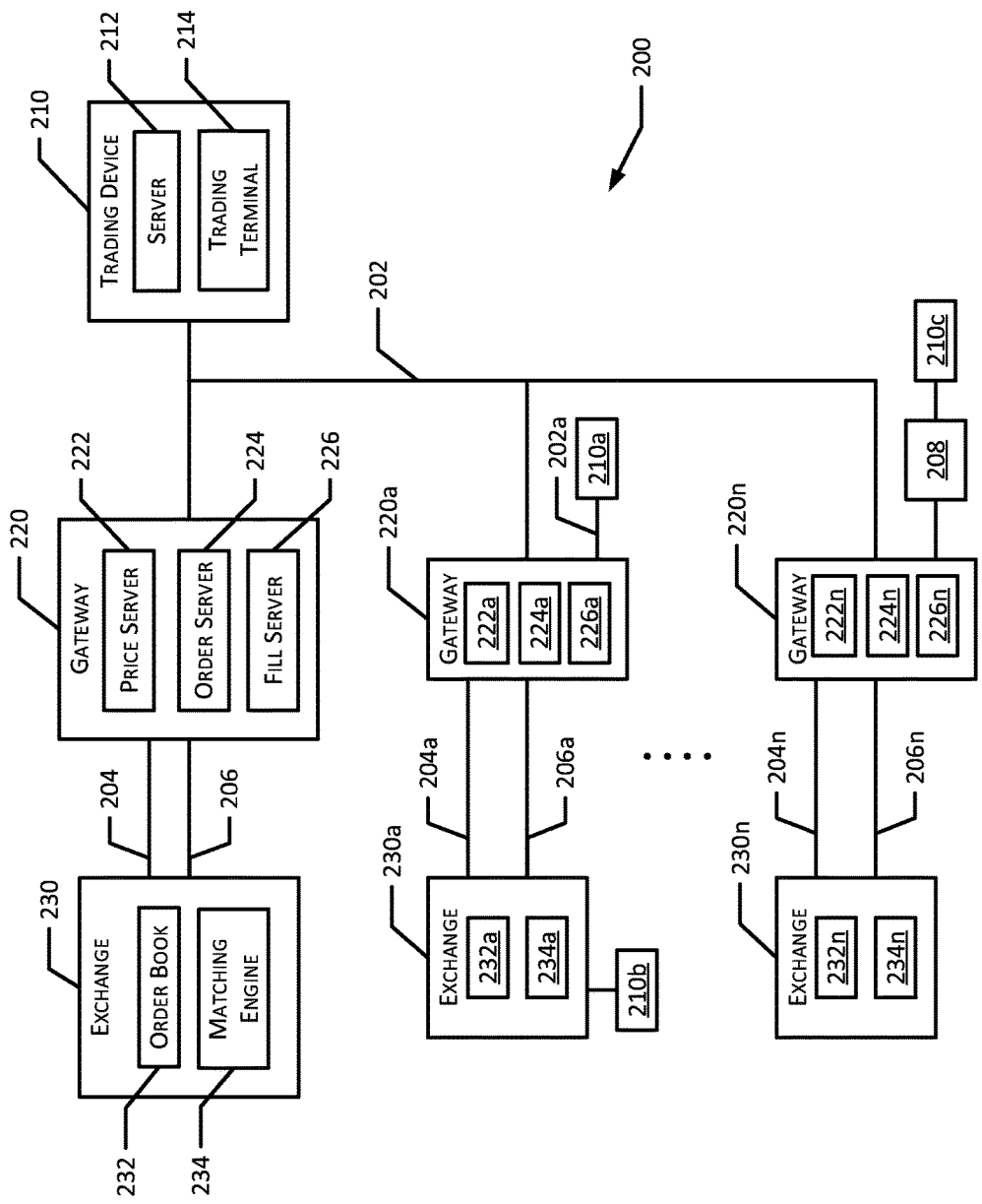
FIG. 2 illustrates a block diagram of another example electronic trading system in which certain examples may be employed.

FIG. 2 illustrates a block diagram of another example electronic trading system 200 in which certain examples may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain examples, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain examples, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain examples, the gateway 220 is part of the trading device 210. For example, the components of the gateway 220 may be part of the same computing platform as the trading device 210. As another example, the functionality of the gateway 220 may be performed by components of the trading device 210. In certain examples, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
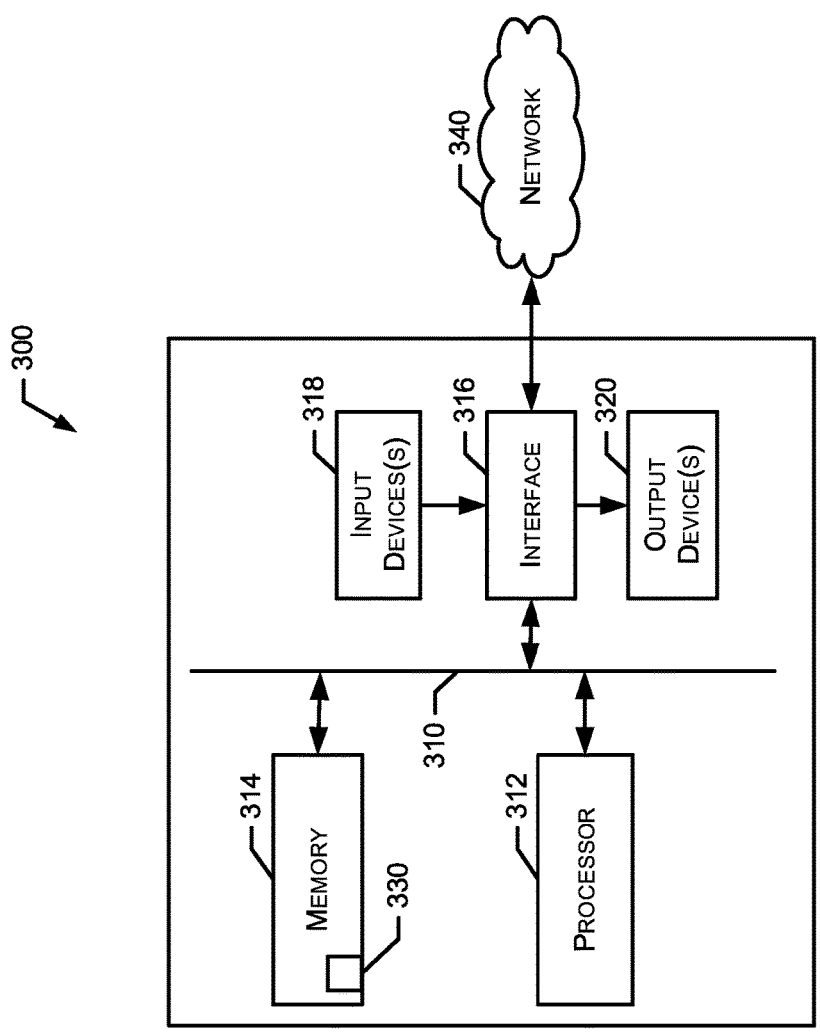
FIG. 3 illustrates a block diagram of an example computing device which may be used to implement the disclosed examples.

FIG. 3 illustrates a block diagram of an example computing device 300 which may be used to implement the disclosed examples. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain examples, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain examples, the trading application 330 may be accessed from or stored in different locations. The processor 312 may access the trading application 330 stored in the memory 314 and execute computer-readable instructions included in the trading application 330.

In certain examples, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

Figure 4:
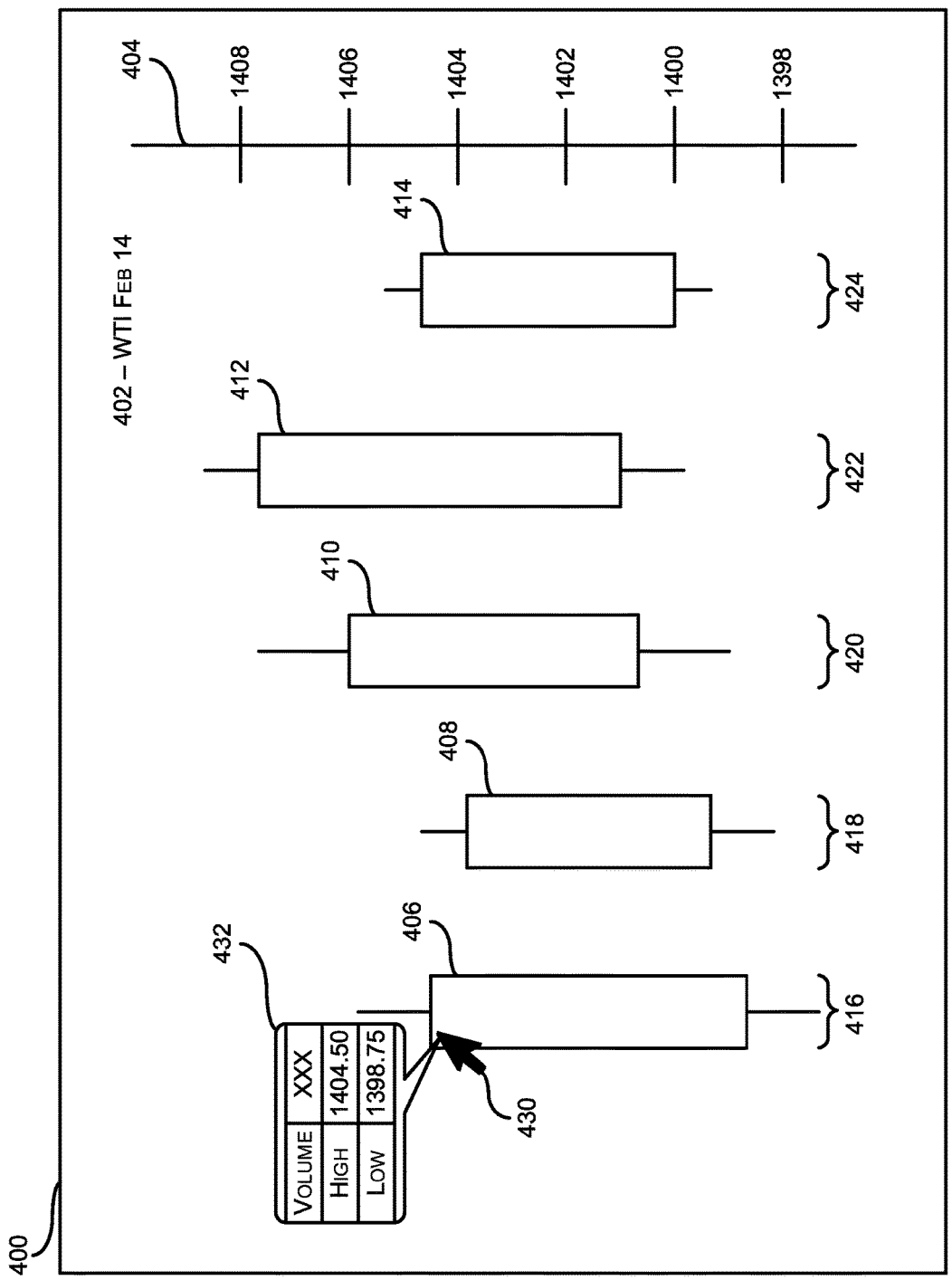
FIG. 4 illustrates an example variable display to chart bars with variable scaling and/or aggregation.

V. Example Methods to Display Chart Bars with Variable Scaling and/or Aggregation FIG. 4 illustrates an example variable display 400. The variable display 400 may be generated by a tradeable object variable display module executed by, for example, the processor 312. In the illustrated example, the variable display 400 charts a tradeable object 402 (e.g., the February 2014 Crude Oil futures traded by at the New York Mercantile Exchange (NYMEX) and identified as "WTI Feb 14") on the variable display 400.

The example variable display 400 includes tradeable object bars 406, 408, 410, 412, 414. A tradeable object bar represents an aggregation of market data for a tradeable object. In the illustrated example, each tradeable object bar represents market data (e.g., received from the NYMEX for the February 2014 Crude Oil futures identified as "WTI Feb 14") aggregated over different periods of time. For example, the tradeable object bar 406 is a graphical representation of market data aggregated over a first period of time 416, the tradeable object bar 408 is a graphical representation of market data aggregated over a second period of time 418, the tradeable object bar 410 is a graphical representation of market data aggregated over a third period of time 420, the tradeable object bar 412 is a graphical representation of market data aggregated over a fourth period of time 422, and the tradeable object bar 414 is a graphical representation of market data aggregated over a fifth period of time 424. In the illustrated example, the variable display 400 includes an example axis 404 to, for example, normalize prices for the tradeable object bars 406, 408, 410, 412, 414.

In some examples, a trader may desire additional information about a tradeable object bar. In the illustrated example of FIG. 4, a trader may use an input device (e.g., a mouse, touchscreen, touch pad, track ball, etc.) to select a tradeable object bar by moving an example cursor 430 over, on top of, adjacent to, or otherwise in relationship with the tradeable object bar and clicking the mouse. In the illustrated example, selecting a tradeable object bar launches a new window 432 in which additional information about the selected tradeable object bar is displayed. In some examples, the new window 432 may include market indicators such as conditions relating to a particular market. For example, historic and/or current market indicators may indicate the inside market, open/close price, high price, low price, or other market conditions.

As described above, the variable display 400 is a graphical representation of a set of data (e.g., market data received from an exchange) associated with the tradeable object 402 (e.g., WTI Feb 14). In the illustrated example, the variable display 400 is a chart. Example charts include a bar chart, a candlestick chart, a timeline chart, an OHLC (open-high-low-close) chart, etc.

A bar chart is a chart with rectangular bars with lengths indicating the values that they represent. The bars can be plotted vertically or horizontally. For example, the bars may be vertically-aligned market indicia. A candlestick chart is a graphical representation of price movements for a given period of time. Candlesticks may be formed by the opening, high, low and closing prices of a tradeable object. If the opening price is above the closing price, then a filled (normally red or black) candlestick is drawn. Typically, if the closing price is above the opening price, the candlestick may be shown as green or as a hollow candlestick (e.g., white body with a black frame). The filled or hollow portion of the candlestick is known as the body or real body, and can be long, normal or short depending on its proportion to the lines above or below it. The lines above and below (sometimes referred to as "shadows," "tails" or "wicks") represent the high and low price ranges within a specified time period. However, not all candlesticks have shadows. A timeline chart illustrates relative movement of the tradeable object over time.

An open-high-low-close (OHLC) chart is a type of chart typically used to illustrated changes or movements in the price of a tradeable object over time or any other sampling method such as volume or other market data attributes. Each vertical line on the chart shows the price range (e.g., the highest and the lowest prices) over one unit of time (e.g., one minute, one hour, daily, etc.). Tick marks project from each side of the line indicating the opening price (e.g., for a daily bar chart, this would be the starting price for that day) on the left, and the closing price for that time period on the right. The bars may be shown in different hues depending on whether prices rose or fell in the respective period of time.

In the illustrated example, the location or position of a tradeable object bar is based on (e.g., dependent on, calculated from, derived from) the market data for respective periods of time. In some examples, the location or position of a tradeable object bar is based on the attributes of the tradeable object with respective to the axis 404. For example, the tradeable object bars 406, 408, 410, 412, 414 included in the variable display 400 represent price attributes of the tradeable object 402 for the corresponding periods of time 416, 418, 420, 422, 424. In some examples, price attributes may be represented include the high price, the low price, the average high price, the average low price, the average midpoint, the average ask, the average bid, the volume-weighted average price (VWAP), etc.

In the illustrated variable display 400, the right-most tradeable object bar indicates the most recent period of time and is the most recent tradeable object bar presented in the variable display 400. For example, the fifth period of time 424 is more recent in comparison to the first period of time 416. Accordingly, the tradeable object bar 414 is representative of newer market data received (e.g., for the tradeable object 402) in comparison to the market data graphically represented by the tradeable object bar 406. In some such examples, the tradeable object bar 414 is the most recent (e.g., the last) tradeable object bar presented in the variable display 400. However, other approaches may additionally or alternatively be used. For example, after a screen refresh is executed, the tradeable object bar 414 may be presented before the tradeable object bar 406.

In some examples, the graphical characteristic(s) of a tradeable object bar (e.g., location or position and/or width) is variable. For example, as described in connection with FIG. 6, an example variable display 600 shows tradeable object bars in which a width of a first tradeable object bar is decreased in comparison to a width of a second tradeable object bar representative of a "newer" (e.g., more recent) period of time.

In some examples, to determine the width of a tradeable object bar, a width-scaling factor is applied relative to the width of other tradeable object bars in the variable display 400. For example, the bar-width (e.g., number of pixels) of the tradeable object bar 418 may be 90% (e.g., a width-scaling factor of 0.9) of the bar-width of the tradeable object bar 420. In some examples, the width-scaling factor is applied to each tradeable object bar relative (e.g., in comparison) to the neighboring tradeable object bar representative of newer market data. In some other examples, the width-scaling factor may be applied to a cluster or set of tradeable object bars relative to a neighboring cluster or set of tradeable object bars representative of newer market data. In some examples, the width-scaling factor (e.g., a default width-scaling factor) may be automatically applied to the tradeable object bars. For example, the variable display module may apply a width-scaling factor based on the amount of market data to present, based on the viewable area of the variable display 400 (e.g., based on a number of pixels), based on the number of tradeable objects to graphically represent in the variable display 400, the tradeable objects grouped and/or related for comparison, etc. In some examples, a trader may select the width-scaling factor to apply to the tradeable object bars. In some such examples, the trader may utilize a configuration interface such as an example configuration interface 500 described in connection with FIG. 5. By decreasing the width of older (e.g., historical) tradeable object bars, less space is utilized in presenting the same amount of information, and, as a result, more information can be graphically represented in the variable display. Increasing the amount of information displayed (e.g., over a longer period of time) may be useful for identifying a trend between the price and the volume of the tradeable object, for example.

In some examples, spacing between consecutive tradeable object bars in the variable display 400 is variable. For example, a spatial-scaling factor is applied to the tradeable object bars shown in the variable display 600 of FIG. 6 to determine the location or position of each tradeable object bar relative to other tradeable object bars. In some examples, the spatial-scaling factor is applied to each tradeable object bar relative (e.g., in comparison) to the neighboring tradeable object bar representative of newer market data. In some other examples, the spatial-scaling factor may be applied to a cluster or set of tradeable object bars relative to a neighboring cluster or set of tradeable object bars representative of newer market data. In some examples, the spatial-scaling factor (e.g., a default spatial-scaling factor) may be automatically applied to the tradeable object bars (e.g., based on the amount of market data to present, based on the viewable area of the variable display 400 (e.g., based on a number of pixels), based on the number of tradeable objects to graphically represent in the variable display 400, the tradeable objects grouped and/or related for comparison, etc.). In some examples, a trader may select the spatial-scaling factor to apply to the tradeable object bars. In some such examples, the trader may utilize a configuration interface such as an example configuration interface 500 described in connection with FIG. 5. By decreasing the bar-spacing of older (e.g., historical) tradeable object bars, less space is utilized in presenting the same amount of information, and, as a result, more information can be graphically represented in the variable display. By increasing the amount of information displayed (e.g., graphically representing market data over a longer period of time) to the trader, the trader may detect the trend between the price and the volume based on the appearance of the tradeable object bars.

In some examples, a period of time over which market data is aggregated may be variable. In some examples, an aggregation-scaling factor (e.g., a default aggregation-scaling factor) may be automatically applied to the received market data. In some examples, a trader interested in identifying swing-highs and/or swing-lows for a tradeable object may select an aggregation-scaling factor to apply to received market data for the tradeable object to vary the period of time represented by each tradeable object bar. In some such examples, the trader may utilize a configuration interface such as an example configuration interface 500 described in connection with FIG. 5. In some examples, tradeable object bars representative of older market data may be aggregated over lengthening periods of time in comparison to more recent tradeable object bars. As described in connection with FIG. 7 below, tradeable object bars shown in an example variable display 700 are representative of varying durations of time. For example, the most recent tradeable object bar may be a visual representation of market data aggregated over a 1 minute period of time, while the tradeable object bars representative of relatively older market data may be a visual representation of market data aggregated over 5 minutes, 1 hour, a day, etc.

Although the example variable display 400 charts only one tradeable object, other examples may chart more than one tradeable object such as two, three or four tradeable objects. Furthermore, although the example variable display 400 displays market data aggregated over a period of time, other approaches may additionally or alternatively be used. For example, the tradeable object bars may represent market data at a moment in time. In some examples, the market data may be aggregated using a non-time attribute such as volume, price, ticks, etc.

In some examples, the variable display is configured. For example, a trader may select a tradeable object to display, select the scaling factors (e.g., the width-scaling factor, the spatial-scaling factor and/or the aggregation-scaling factor) applied to the graphical characteristics of the tradeable object bars, etc. The variable display may be configured prior to or after launching the variable display. For example, a trader may configure the variable display prior to initially launching the variable display and then update the configuration after launching the variable display.

In some examples, configuring the variable display may include using a configuration interface. FIG. 5 illustrates an example configuration interface 500 from which a trader may select different configurations (e.g., settings and/or parameter values). In the illustrated example, the configuration interface 500 includes an example scaling factors selection interface 502 and an example aggregation units selecting interface 518. However, other interfaces may also be included in the configuration interface 500. For example, the configuration interface 500 may include an interface with which the trader selects which tradeable object(s) to chart, spatial dimensions (e.g., the area or number of pixels to include) for the variable display, what attribute(s) of the tradeable object to chart, etc.

In some examples, the configuration interface 500 may include an interface with which default settings can be selected. For example, a default bar-width value (e.g., 10 pixels) may be selected, a default bar-spacing value (e.g., 15 pixels) may be selected and/or a default aggregation period of time (e.g., 1 minute) may be selected. In some examples, the default settings (sometimes referred to as "base settings" or "anchor settings") may be selected to define a "normal" view of the market data (e.g., without variable scaling and/or aggregation).

The example scaling factors selection interface 502 facilitates defining the one or more scaling factors to display chart bars with variable scaling and/or aggregation. For example, a width-scaling factor 504 may be selected, a spatial-scaling factor 508 may be selected and/or an aggregation-scaling factor 512 may be selected.

Selection of the scaling factors 504, 508, 512 may be automatic and/or manual. For example, default scaling-factors may be used until changed. In the illustrated example, the scaling factors selection interface 502 indicates that applying a width-scaling factor 504 set to one results in a tradeable object bar that is ten pixels across (e.g., the default bar-width). Applying a spatial-scaling factor 508 set to one results in a variable display in which the distance between consecutive tradeable object bars is fifteen pixels. Similarly, applying an aggregation-scaling factor 512 set to one results in tradeable object bars representative of market data for one minute periods of time (e.g., intervals).

In some examples, the default settings may be applied to the most recent tradeable object bar and the one or more scaling factors may be applied to the tradeable object bars based on the default settings. For example, when the default bar-width is set to ten pixels and the width-scaling factor is set to 90% (e.g., 0.90), the most recent tradeable object bar is ten pixels wide, the second most recent tradeable object bar is nine pixels wide (e.g., 9=10*0.9), the third most recent tradeable object bar is 8.1 pixels across (e.g., 8.1=9*0.9), etc. In some examples, the number of pixels may be rounded up and/or rounded down.

In some examples, the bar-width, the bar-spacing and/or the aggregation period may be adjusted manually or automatically by a formula. For example, an algorithm may be set to dynamically change one or more of the scaling factors 504, 508, 512 based on, for example, the amount of market data available. In the illustrated example, the scaling factors selection interface 502 includes an interface 516 with which an equation (e.g., formula, algorithm, etc.) can be defined. For example, a logarithmic equation may be defined to apply a sliding scale to the scaling factor values.

In the illustrated example, the configuration interface 500 includes the aggregation units selecting interface 518 to select the attributes for aggregating the market data. For example, a time attribute interface 520 indicates that the market data, when selected, may be aggregated in minutes, hours or days, or other units of time. A volume attribute interface 522 indicates that the market data, when selected, may be aggregated based on the number of contracts traded. A price attribute interface 524 indicates that the market data, when selected, may be aggregated based on different price-values. An example tick attribute interface 526 indicates that the market data, when selected, may be aggregated based on tick values. In certain examples, market data may be aggregated based on the number of ticks away from the inside market. For example, market data one (1) tick away from the inside market may be aggregated into a first group, market data five (5) ticks away from the inside market may be aggregated into a second group tick, and market data ten (10) ticks away from the inside market may be aggregated into a third group values. Different relative tick values and/or scales may be used to aggregate market data based on, for example, a trader's preferences, and the display space available.

Figure 6:
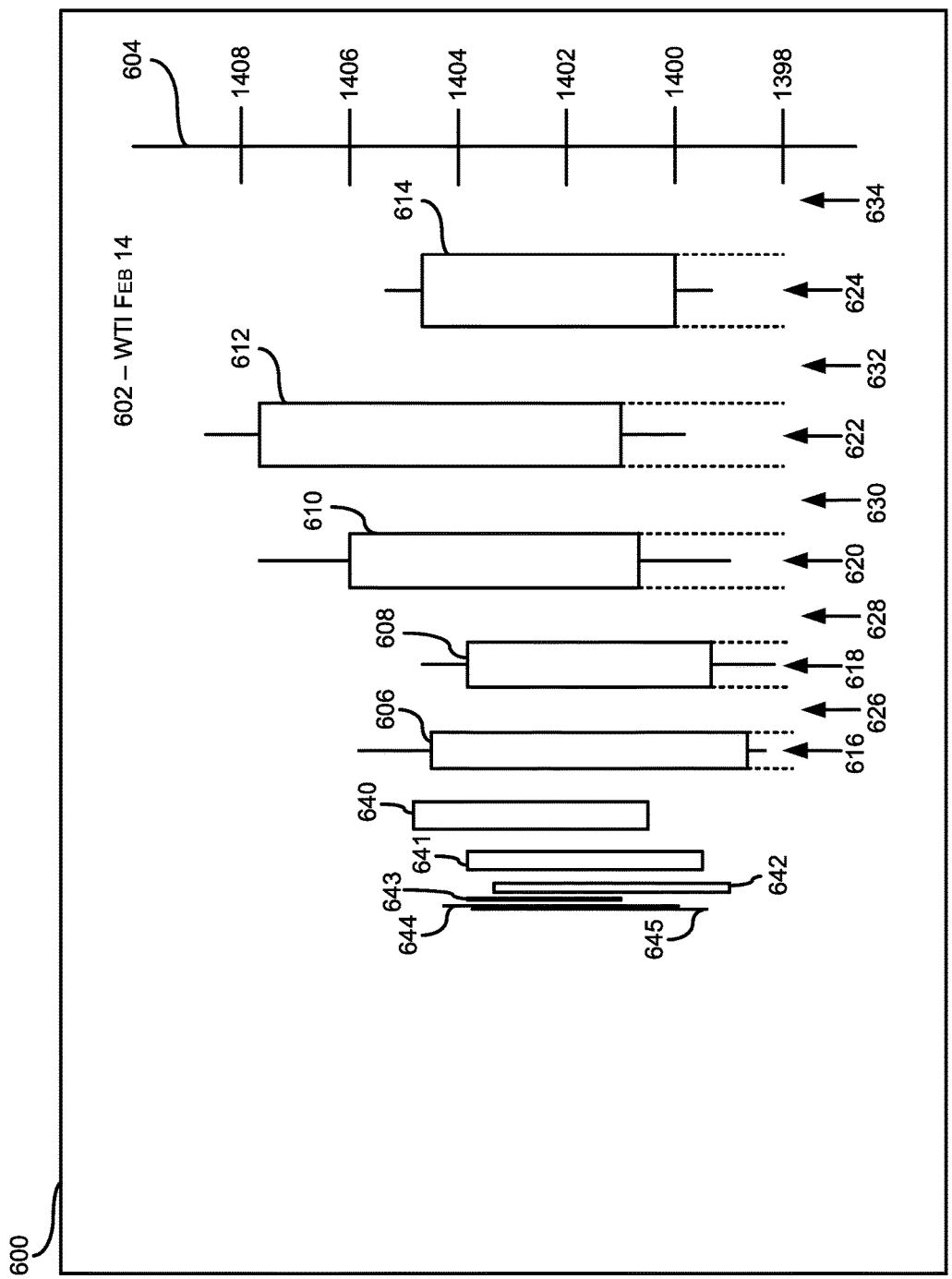
FIG. 6 illustrates another example variable display to chart bars with variable scaling and/or aggregation.

FIG. 6 illustrates another example variable display 600. The variable display 600 may be generated by a tradeable object variable display module, as discussed above. In the illustrated example, the variable display 600 charts a tradeable object 602 (e.g., the February 2014 Crude Oil futures traded by at the New York Mercantile Exchange (NYMEX) identified as "WTI Feb 14") on the variable display 600.

The example variable display 600 includes tradeable object bars 606, 608, 610, 612, 614. Each tradeable object bar is a visual representation of market data aggregated over a period of time. A tradeable object bar represents an aggregation of market data for a tradeable object. In the illustrated example, each tradeable object bar represents market data (e.g., received from the NYMEX for the February 2014 Crude Oil futures) aggregated over different periods of time. For example, the tradeable object bar 606 is a graphical representation of market data aggregated over a first period of time (e.g., a first subset of the market data), the tradeable object bar 608 is a graphical representation of market data aggregated over a second period of time (e.g., a second subset of the market data), the tradeable object bar 610 is a graphical representation of market data aggregated over a third period of time (e.g., a third subset of the market data), the tradeable object bar 612 is a graphical representation of market data aggregated over a fourth period of time (e.g., a fourth subset of the market data), and the tradeable object bar 614 is a graphical representation of market data aggregated over a fifth period of time (e.g., a fifth subset of the market data). In the illustrated example, the variable display 600 includes an example axis 604 to, for example, normalize prices for the tradeable object bars 606, 608, 610, 612, 614.

In the illustrated example of FIG. 6, the tradeable object bars 606, 608, 610, 612, 614 are displayed using variable scaling. For example, each of the tradeable object bars 606, 608, 610, 612, 614 has a respective bar-width 616, 618, 620, 622, 624 and a respective bar-spacing 626, 628, 630, 632, 634.

In the illustrated example, the bar-widths for the tradeable object bars 606, 608, 610, 612, 614 are varied based on the applied width-scaling factor. In the illustrated example, a 90% width-scaling factor is applied to the bar-width of each tradeable object bar relative to its adjacent bar, and the default bar-width is ten pixels across. For example, the bar-width 624 of the most recent tradeable object bar (e.g., the tradeable object bar 614) is ten pixels. Thus, in the illustrated example, the bar-width 622 of the tradeable object bar 612 (e.g., nine pixels across) is less than the bar-width 624 of the tradeable object bar 614 (e.g., ten pixels across), the bar-width 620 of the tradeable object bar 610 (e.g., 8.1 pixels across) is less than the bar-width 622 of the tradeable object bar 612 (e.g., 9 pixels across), the bar-width 618 of the tradeable object bar 608 (e.g., 7.3 pixels across) is less than the bar-width 620 of the tradeable object bar 610 (e.g., 8.1 pixels across), and the bar-width 606 of the tradeable object bar 606 (e.g., 6.6 pixels across) is less than the bar-width 608 of the tradeable object bar 608 (7.3 pixels across). In other examples, the bar-width may be selected based on an equation or formulaic factor. For example, the bar-width may be based on a volume traded within each respective tradeable object bar, a logarithmic relation, a sliding-scale, etc.

In the illustrated example of FIG. 6, the bar-spacing between consecutive tradeable object bars is varied based on the applied spatial-scaling factor. In the illustrated example, a 90% spatial-scaling factor applied to the bar-spacing between consecutive tradeable object bars, and the default bar-spacing is fifteen pixels. That is, the bar-spacing 634 of the most recent tradeable object bar (e.g., the distance between the tradeable object bar 614 and the axis 604) is fifteen pixels. Thus, in the illustrated example, the bar-spacing 632 of the tradeable object bar 612 (e.g., 13.5 pixels) is less than the bar-spacing 634 of the tradeable object bar 614 (e.g., fifteen pixels), the bar-spacing 630 of the tradeable object bar 610 (e.g., 12.2 pixels) is less than the bar-spacing 632 of the tradeable object bar 612 (e.g., 13.5 pixels), the bar-spacing 628 of the tradeable object bar 608 (e.g., 10.9 pixels) is less than the bar-spacing 630 of the tradeable object bar 610 (e.g., 12.2 pixels), and the bar-spacing 616 of the tradeable object bar 606 (e.g., 9.8 pixels) is less than the bar-spacing 618 of the tradeable object bar 608 (10.9 pixels). In other examples, the bar-spacing may be selected based on an equation or formulaic factor.

In some examples, the variable display 600 stops drawing tradeable object bars when the scaled-bar width of the tradeable object bar is zero (or less than one pixel).

As discussed above, due to the variable scaling, additional information can be displayed in the variable display 600. In the illustrated example, tradeable object bars 640-645 represent market data for older aggregation periods that can now be shown due to the additional space in the variable display 600. Each of the tradeable object bars 640-645 has a respective bar-width that is 90% of its adjacent tradeable object bar, and the bar-spacing between two tradeable object bars is 90% of its adjacent bar-spacing.

Figure 7:
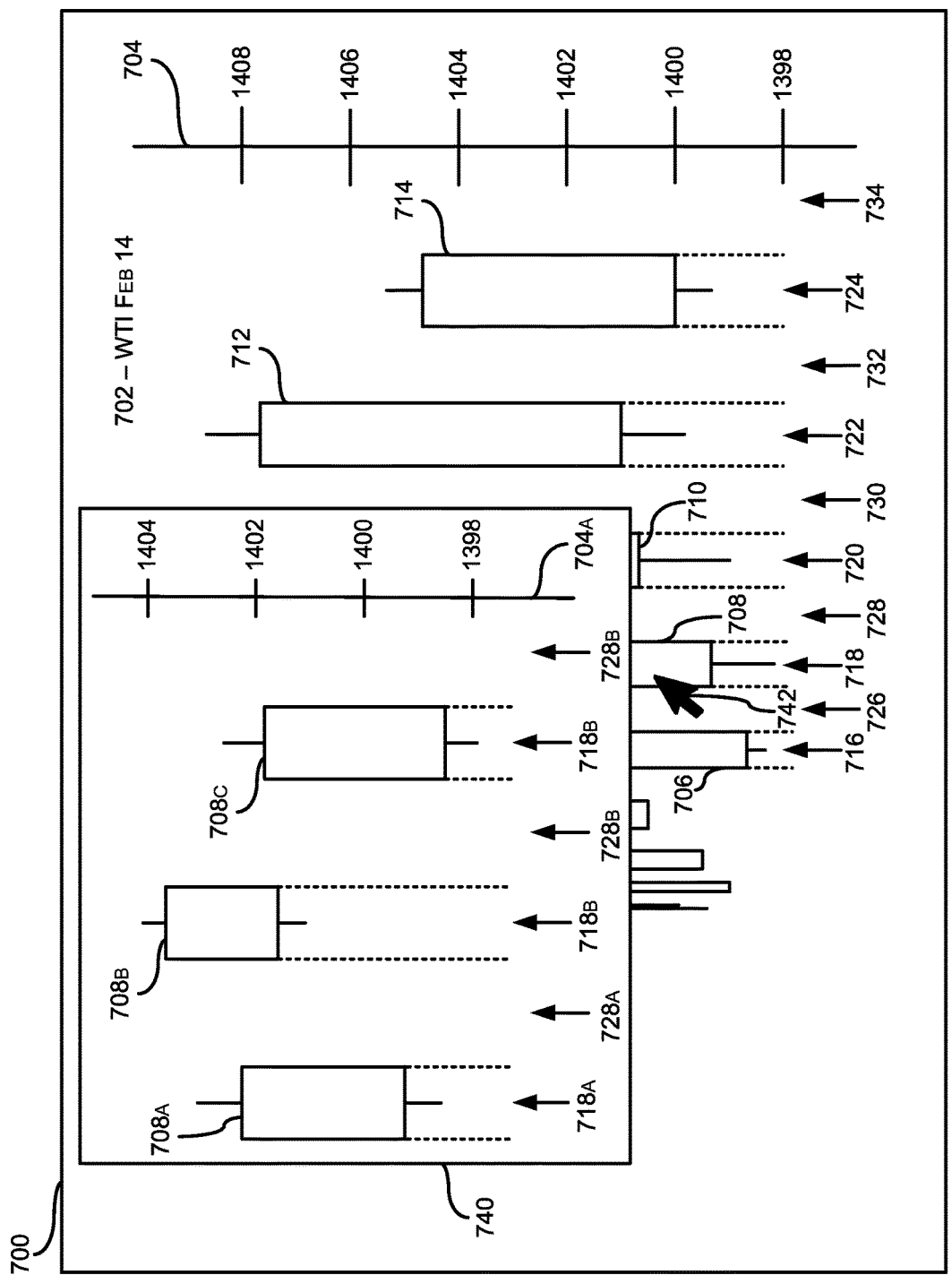
FIG. 7 illustrates another example variable display to chart bars with variable scaling and/or aggregation.

FIG. 7 illustrates another example variable display 700. The variable display 700 may be generated by a tradeable object variable display module, as discussed above. In the illustrated example, the variable display 700 charts a tradeable object 702 (e.g., the February 2014 Crude Oil futures traded by at the New York Mercantile Exchange (NYMEX) identified as "WTI Feb 14") on the variable display 700.

The example variable display 700 includes tradeable object bars 706, 708, 710, 712, 714. Each tradeable object bar is a visual representation of market data aggregated over a period of time. A tradeable object bar represents an aggregation of market data for a tradeable object. In the illustrated example, each tradeable object bar represents market data (e.g., received from the NYMEX for the February 2014 Crude Oil futures) aggregated over different periods of time. For example, the tradeable object bar 706 is a graphical representation of market data aggregated over a first period of time (e.g., a first subset of the market data), the tradeable object bar 708 is a graphical representation of market data aggregated over a second period of time (e.g., a second subset of the market data), the tradeable object bar 710 is a graphical representation of market data aggregated over a third period of time (e.g., a third subset of the market data), the tradeable object bar 712 is a graphical representation of market data aggregated over a fourth period of time (e.g., a fourth subset of the market data), and the tradeable object bar 714 is a graphical representation of market data aggregated over a fifth period of time (e.g., a fifth subset of the market data). In the illustrated example, the variable display 700 includes an example axis 704 to, for example, normalize prices for the tradeable object bars 706, 708, 710, 712, 714.

In the illustrated example of FIG. 7, the tradeable object bars 706, 708, 710, 712, 714 are displayed using variable scaling. For example, each of the tradeable object bars 706, 708, 710, 712, 714 has a respective bar-width 716, 718, 720, 722, 724 and a respective bar-spacing 726, 728, 730, 732, 734. In the illustrated example, the bar-widths for the tradeable object bars 706, 708, 710, 712, 714 are varied based on the applied width-scaling factor. In the illustrated example, a 90% width-scaling factor is applied to the bar-width of each tradeable object bar relative to its adjacent bar, and the default bar-width is ten pixels across. For example, the bar-width 724 of the most recent tradeable object bar (e.g., the tradeable object bar 714) is ten pixels.

In the illustrated example of FIG. 7, the bar-spacing between consecutive tradeable object bars is varied based on the applied spatial-scaling factor. In the illustrated example, a 90% spatial-scaling factor applied to the bar-spacing between consecutive tradeable object bars, and the default bar-spacing is fifteen pixels. That is, the bar-spacing 734 of the most recent tradeable object bar (e.g., the distance between the tradeable object bar 714 and the axis 704) is fifteen pixels.

In some examples, a trader may desire additional information about a tradeable object bar. For example, the trader may desire a "normal" view of a tradeable object bar that has been scaled. In the illustrated example of FIG. 7, the trader selects the tradeable object bar 708. In the illustrated example, doing so launches a new window 740 in which additional information about the selected tradeable object bar is displayed. For example, the window 740 includes tradeable object bars 708A, 708B, 708C representative of the market data aggregated to form the tradeable object bar 708. To provide the trader a more granular view of the graphical representation, the window 740 presents the tradeable objects bars 708A, 708B, 708C with respective bar-widths 718A, 718B, 718C set to the default bar-width (e.g., ten pixels) and respective bar-spacings 728A, 728B, 728C set to the default bar-spacing (e.g., fifteen pixels). The window 740 includes an example axis 704A to normalize the tradeable object bars 708A, 708B, 708C.

In the illustrated example of FIG. 7, a trader may use an input device (e.g., a mouse, touch screen, touch pad, track ball, etc.) to select a tradeable object bar by moving an example cursor 742 over, on top of, adjacent to, or otherwise in relationship with the tradeable object bar and clicking the mouse. However, other approaches may additionally or alternatively be used. For example, the trader may position the cursor 742 over, on top of, adjacent to, or otherwise in relationship with the tradeable object bar without clicking the mouse (e.g., "hover" the cursor over the tradeable object bar, etc.).

In some examples, rather than launching the new window 740, the variable display 700 may adjust the location or position of the tradeable object bars 706, 708, 710, 712, 714 so that the information provided in the window 740 is in-line with the tradeable object bars 706, 708, 710, 712, 714. For example, the tradeable object bar 708 may be replaced with the tradable object bars 708A, 708B, 708C presented in the window 740. In some such examples, the variable display 700 may adjust the bar-widths and/or bar-spacings of the other tradeable object bars 706, 710, 712, 714. For example, the variable display 700 may "squeeze" the view of the other tradeable object bars 706, 710, 712, 714 by decreasing the bar-widths 716, 720, 722, 724 and/or the bar-spacings 726, 730, 732, 734 of the respective tradeable object bars. In some such examples, the variable display 700 presents the "squeezed" view for the duration that the tradeable object bar 708 is selected. For example, when the tradeable object bar 708 is de-selected (e.g., the trader moves the cursor away from the tradeable object bar 708), the variable display 700 re-adjusts the bar-widths and/or bar-spacings based on the selected width-scaling factor and/or the selected spatial-scaling factor.

Figure 8:
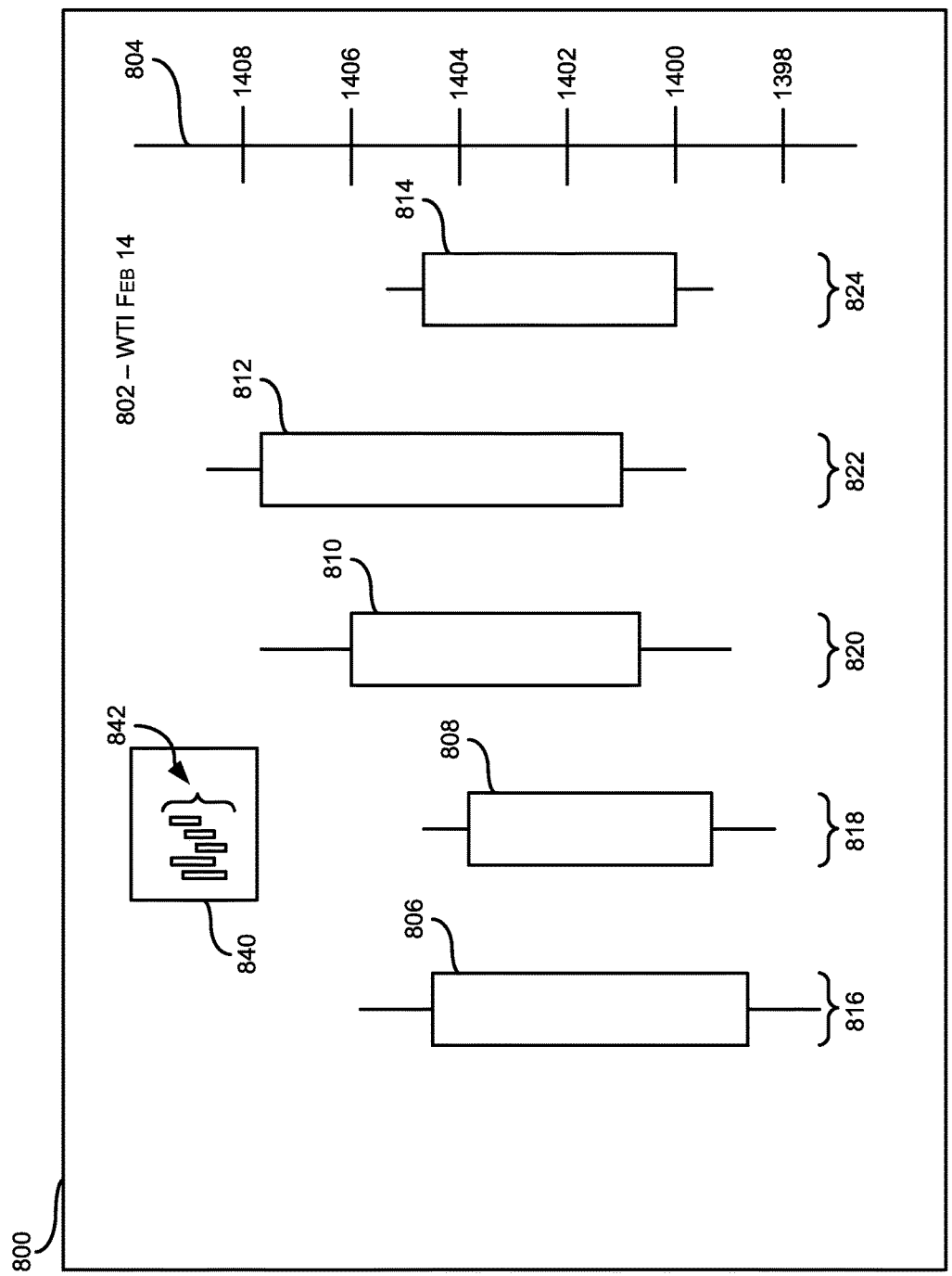
FIG. 8 illustrates another example variable display to chart bars with variable scaling and/or aggregation.

FIG. 8 illustrates another example variable display 800. The variable display 800 may be generated by a tradeable object variable display module, as discussed above. In the illustrated example, the variable display 800 charts a tradeable object 802 (e.g., the February 2014 Crude Oil futures traded by at the New York Mercantile Exchange (NYMEX) identified as "WTI Feb 14") on the variable display 800.

The example variable display 800 includes tradeable object bars 806, 808, 810, 812, 814. A tradeable object bar represents an aggregation of market data for a tradeable object. In the illustrated example, each tradeable object bar represents market data (e.g., received from the NYMEX for the February 2014 Crude Oil futures) aggregated over different periods of time. For example, the tradeable object bar 806 is a graphical representation of market data aggregated over a first period of time 816 (e.g., a first subset of the market data), the tradeable object bar 808 is a graphical representation of market data aggregated over a second period of time 818 (e.g., a second subset of the market data), the tradeable object bar 810 is a graphical representation of market data aggregated over a third period of time 820 (e.g., a third subset of the market data), the tradeable object bar 812 is a graphical representation of market data aggregated over a fourth period of time 822 (e.g., a fourth subset of the market data), and the tradeable object bar 814 is a graphical representation of market data aggregated over a fifth period of time 824 (e.g., a fifth subset of the market data). In the illustrated example, the variable display 800 includes an example axis 804 to, for example, normalize prices for the tradeable object bars 806, 808, 810, 812, 814.

In the illustrated example of FIG. 8, the tradeable object bars 806, 808, 810, 812, 814 are displayed using variable aggregation. For example, the duration of time over which market data is aggregated for each of the aggregation periods 816, 818, 820, 822, 824 varies based on the selected aggregation-scaling factor (e.g., the aggregation-scaling factor 512 of FIG. 5). For example, when the aggregation-scaling factor 512 is set to one (e.g., the default aggregation-scaling factor), then each of the aggregation periods 816, 818, 820, 822, 824 represents the same duration of time (e.g., one minute). In the illustrated example, applying the default aggregation-scaling factor to the tradeable object bars results in five minutes of market data being graphically represented.

However, when the aggregation-scaling factor is set to a value other than one, then the duration of aggregation periods 816, 818, 820, 822, 824 varies. For example, when the aggregation-scaling factor is set to five, then the aggregation period 824 represents market data for the tradeable object 802 that is aggregated over the most recent minute, the aggregation period 822 represents market data for the tradeable object 802 that is aggregated over the next five minutes (e.g., minutes 1-6), the aggregation period 820 represents market data for the tradeable object 802 that is aggregated over the next twenty-five minutes (e.g., minutes 6-31), the aggregation period 818 represents market data for the tradeable object 802 that is aggregated over the next 125 minutes (e.g., minutes 31-156), and the aggregation period 816 represents market data for the tradeable object 802 that is aggregated over the next 625 minutes (e.g., minutes 156-781). As a result, rather than representing market data for only five minutes (e.g., when the aggregation-scaling factor is set to the default value), the variable display 800 represents market data for 781 minutes. In some such examples, the trader may desire to see swing-highs and/or swing-lows associated with the tradeable object 802 rather than, for example, trends.

However, other aggregation-scaling factors may additionally or alternatively be used. For example, the aggregation-scaling factor may be determined using an equation.

In some examples, the trader may desire more detailed information about a tradeable object bar. For example, the trader may select the tradeable object bar 812 to view a more granular view of the market data for that period of time (e.g., minutes 1-6). In some such examples, the variable display 800 may launch a new window 840 similar to the window 740 of FIG. 7 to present a more granular view of the market data. For example, the variable display 800 may apply the default aggregation-scaling period (e.g., one minute) to the market data represented by the tradeable object bar 822 and present new tradeable object bars 842.

In some examples, the window 840 may be presented in-line with the other tradeable object bars 806, 808, 810, 814. For example, the tradeable object bar 812 may be replaced by the tradeable object bars 842. In some examples, the variable display 800 may temporarily adjust the bar-widths and/or bar-spacings of the other tradeable object bars 806, 808, 810, 814 while the tradeable object bars 842 are displayed (e.g., the tradeable object bar 812 is selected).

For example, the variable display 800 may "squeeze" the view of the other tradeable object bars 806, 810, 812, 814 by decreasing the bar-widths and/or the bar-spacing of the respective tradeable object bars. In some such examples, the variable display 800 presents the "squeezed" view for the duration that the tradeable object bar 808 is selected. For example, when the tradeable object bar 808 is de-selected (e.g., the trader moves the cursor away from the tradeable object bar 808), the variable display 800 re-adjusts the bar-widths and/or bar-spacing based on the selected width-scaling factor and/or the selected spatial-scaling factor.

Figure 9:
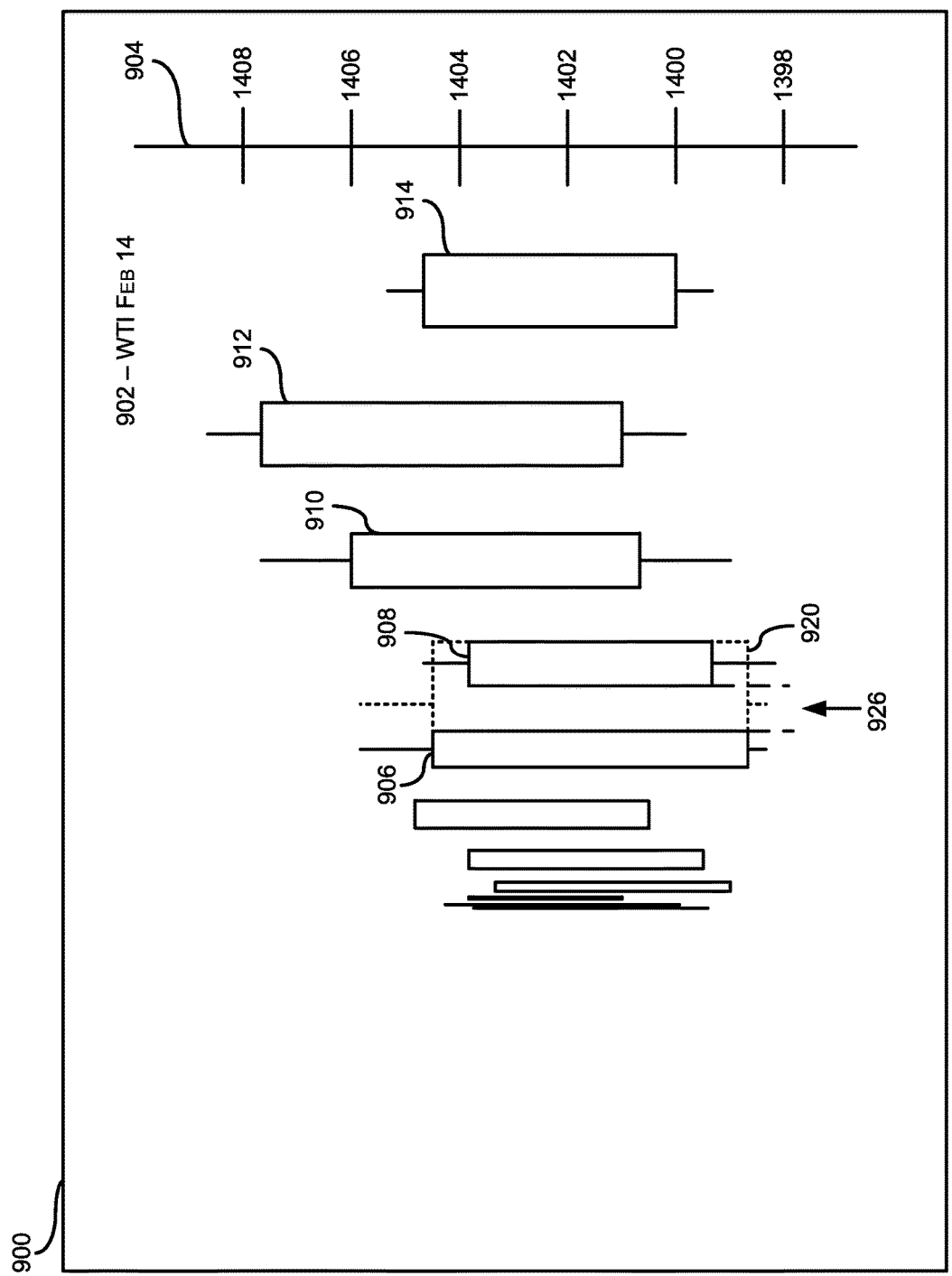
FIG. 9 illustrates another example variable display to chart bars with variable scaling and/or aggregation.

FIG. 9 illustrates another example variable display 900. The variable display 900 may be generated by a tradeable object variable display module, as discussed above. In the illustrated example, the variable display 900 charts a tradeable object 902 (e.g., the February 2014 Crude Oil futures traded by at the New York Mercantile Exchange (NYMEX) identified as "WTI Feb 14") on the variable display 900.

The example variable display 900 includes tradeable object bars 906, 908, 910, 912, 914. A tradeable object bar represents an aggregation of market data for a tradeable object. In the illustrated example, each tradeable object bar represents market data (e.g., received from the NYMEX for the February 2014 Crude Oil futures) aggregated over different periods of time. For example, the tradeable object bar 906 is a graphical representation of market data aggregated over a first period of time (e.g., a first subset of the market data), the tradeable object bar 908 is a graphical representation of market data aggregated over a second period of time (e.g., a second subset of the market data), the tradeable object bar 910 is a graphical representation of market data aggregated over a third period of time (e.g., a third subset of the market data), the tradeable object bar 912 is a graphical representation of market data aggregated over a fourth period of time (e.g., a fourth subset of the market data), and the tradeable object bar 914 is a graphical representation of market data aggregated over a fifth period of time (e.g., a fifth subset of the market data). In the illustrated example, the variable display 900 includes an example axis 904 to, for example, normalize prices for the tradeable object bars 906, 908, 910, 912, 914.

In the illustrated example of FIG. 9, the tradeable object bars 906, 908, 910, 912, 914 are displayed using variable scaling. For example, each of the tradeable object bars 906, 908, 910, 912, 914 has a respective bar-width scaled by applying a width-scaling factor (e.g., the example width-scaling factor 504 of FIG. 5) and a respective bar-spacing scaled by applying a spatial-scaling factor (e.g., the example spatial-scaling factor 508 of FIG. 5). For example, when the width-scaling factor 504 is set to 90%, then the bar-width of a tradeable object bar is 90% that of the adjacent tradeable object bar. Similarly, when the spatial-aggregation factor 508 is set to 90%, then the bar-spacing of a tradeable object bar is 90% that of the adjacent tradeable object bar. In other examples, the bar-width and/or the bar-scaling may be scaled based on an equation or formulaic factor.

In the illustrated example, when the variable display 900 presents the tradeable object bars 906, 908, 910, 912, 914, a determination is made whether displaying the tradeable object bar provides new information. In some such examples, when a first tradeable object bar visually provides no new information in comparison to a second, adjacent tradeable object bar, then the variable display 900 may not present the first tradeable object bar. For example, in the illustrated example, the high-value of the tradeable object bar 908 is less than the high-value of the tradeable object bar 906, and the low-value of the tradeable object bar 906 is less than the low-value of the tradeable object bar 908. As a result, the tradeable object bar 908 visually provides no new information in comparison to the tradeable object bar 906. In some such examples, the tradeable object bar 906 "consumes" the tradeable object bar 908. For example, the bar-width of the tradeable object bar 906 is increased to overlap with the tradeable object bar 908. In the illustrated example, an example tradeable object bar 920 (drawn using a dashed line) is drawn having a bar-width equal to the bar-width of the tradeable object bar 906, the bar-width of the tradeable object bar 908 and bar spacing 926.

In some examples, the trader may select the tradeable object bar 920 to see additional information about the market data graphically represented by the tradeable object bar 920. For example, a new window may launch in which the replaced tradeable object bars 906, 908 are shown. In some examples, the variable display 900 may launch a new window in which the market data represented by the replaced tradeable object bars 906, 908 is shown by applying the default scaling factors (e.g., the width-scaling factor 504 and the spatial-scaling factor 508 are both set to one) to the tradeable objects bars included in the new window. In some examples, the more granular tradeable object bars are displayed in-line with the other tradeable object bars. For example, rather than launching a new window to show the finer market data, the tradeable object bar 920 may be replaced with the granular tradeable object bars.

Figure 10:
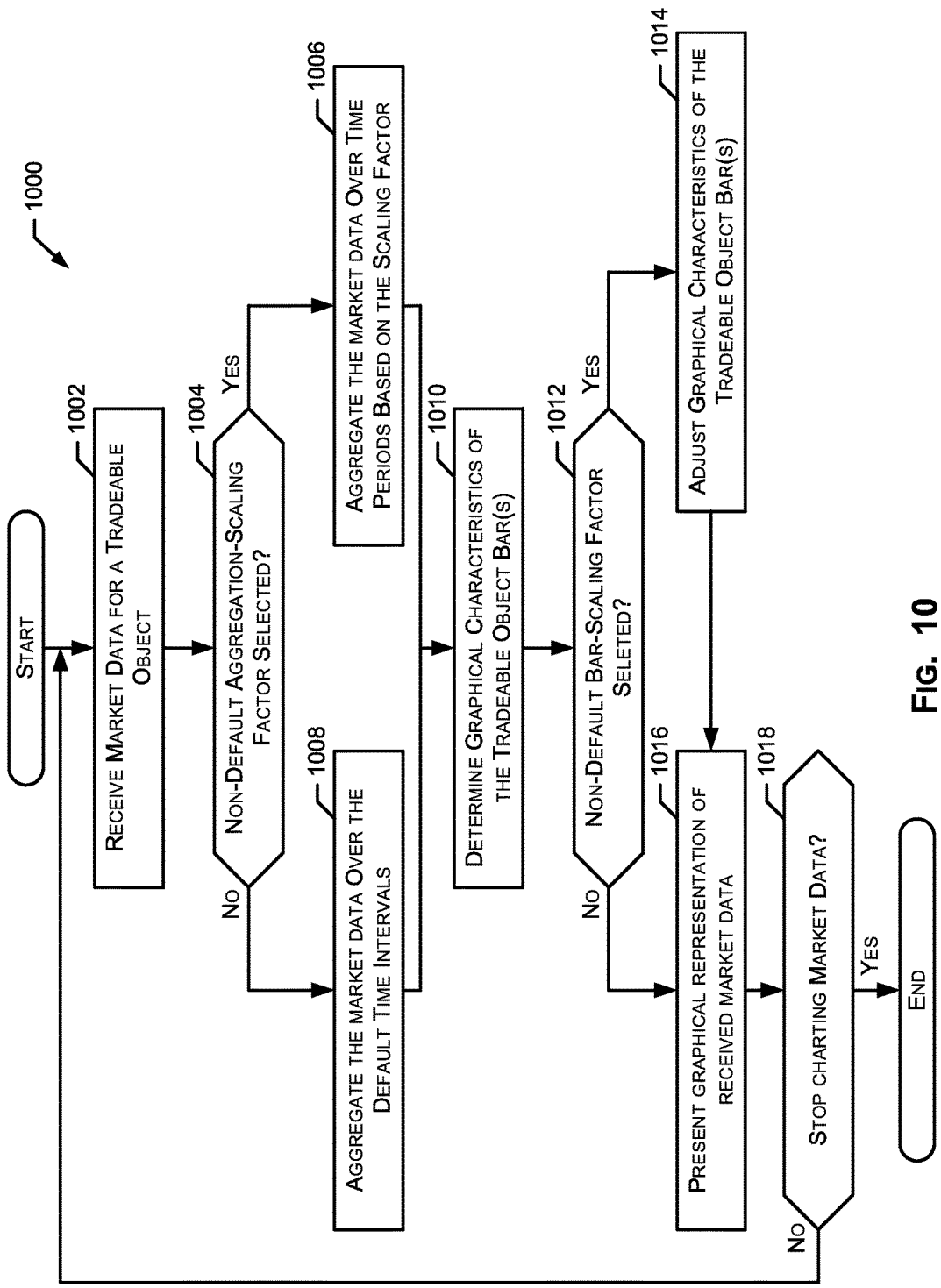
FIG. 10 illustrates a flow diagram of an example method to chart bars with variable scaling and/or aggregation.

FIG. 10 is an example flow diagram of an example method 1000 for charting market data with variable scaling and/or aggregation. The example method 1000 may be implemented by a computing device such as the example trading device 110, the example gateway 120, the example electronic exchange 130 and/or, more generally, the example system 100 of FIG. 1. Control begins at block 1002 when a computing device receives market data for a tradeable object. For example, the computing device may receive market data from an electronic exchange and/or retrieve the market data from memory.

At block 1004, the computing device determines whether a non-default aggregation-scaling factor is to be applied to the market data. For example, the computing device may determine whether a trader selected an aggregation-scaling factor different from the default value (e.g., one minute). If, at block 1004, the computing device determines to apply a non-default aggregation-scaling factor to the market data, then, at block 1006, the computing device aggregates the market data over time periods based on the selected scaling factor.

If, at block 1004, the computing device determines that the default value is to be applied, then, at block 1008, the computing device aggregates the market data in one minute intervals. At block 1010, the computing device determines the graphical characteristics for the one or more tradeable object bars to present in a variable display. For example, the computing device may compute the height of a tradeable object bar based on the difference between the high-value and the low-value for the corresponding aggregation period.

At block 1012, the computing device determines whether non-default bar scaling factors were selected to apply to the tradeable object bars. For example, the computing device may determine whether the trader selected a width-scaling factor and/or a spatial-scaling factor different from the default value (e.g., one). If, at block 1012, the computing device determines that a non-default bar-scaling factor was selected (e.g., the width-scaling factor and/or the spatial-scaling factor was set at less than one), then, at block 1014, the computing device adjusts the graphical characteristics for the tradeable object bars by applying the bar-scaling factor(s). For example, the computing device may determine the bar-width for each of the tradeable object bars based on the width-scaling factor and determine the bar-spacing between consecutive tradeable object bars based on the spatial-scaling factor.

If, at block 1012, the computing device determines that the default bar-scaling factors were selected, or after the computing device adjusts the graphical characteristics of the tradeable object bars at block 1014, then, at block 1016, the computing device launches a variable display to graphically represent the received market data. For example, the computing device may draw the tradeable object bars based on their corresponding graphical characteristics. At block 1018, the computing device determines whether to continue charting market data with variable scaling and/or aggregation. For example, a refresh rate may be applied to the variable display and/or new market data may be received. If, at block 1018, the computing device determines to continue charting market data, then control returns to block 1002. If, at block 1018, the computing device determines not to continue charting market data, then, the method 1000 ends.

Figure 11:
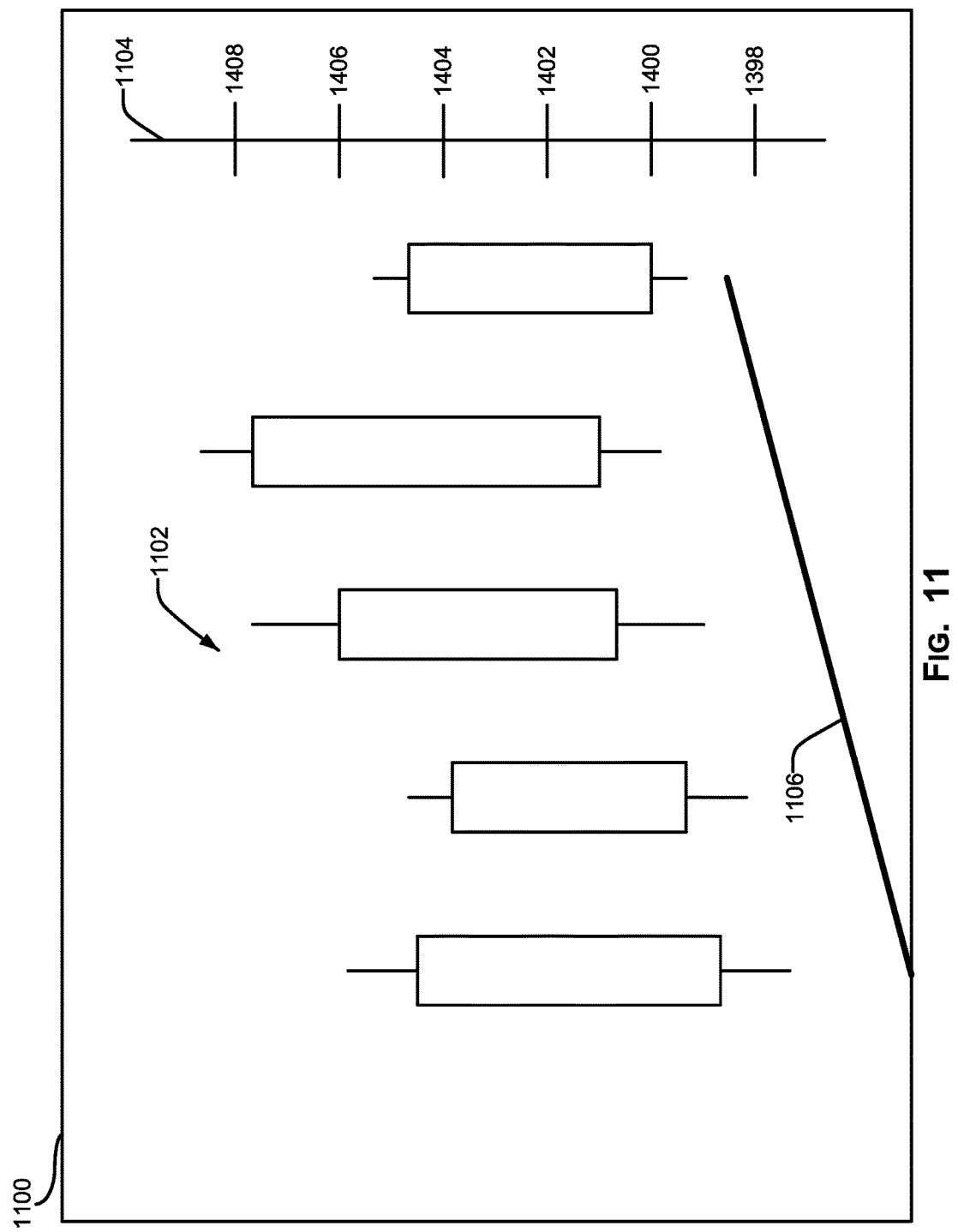
FIG. 11 illustrates another example variable display to chart bars and a trend line with variable scaling and/or aggregation.

FIG. 11 illustrates another example variable display 1100. The variable display 1100 may be generated by a tradeable object variable display module executed by, for example, the processor 312. In the illustrated example, the variable display 1100 displays a plurality of tradeable object bars 1102 related to a tradeable object (e.g., the tradeable object 402 shown in FIG. 4). In the illustrated example, the plurality of tradeable object bars 1102 are displayed without scaling or aggregation of the market data. The plurality of tradeable object bars 1102 are displayed relative to an example axis 1104. The example axis 1104 may represent normalize prices for the tradeable object bars 1102. FIG. 11 further illustrates a trendline 1106. The trendline 1106 illustrates, for example, the direction in which the tradeable object's value may move over time. In other embodiments, the trendline 1106 may be configured to represent other aspects of the market data such as quantity, last traded price, and derived prices such as a price change relative to an opening price.

Figure 12:
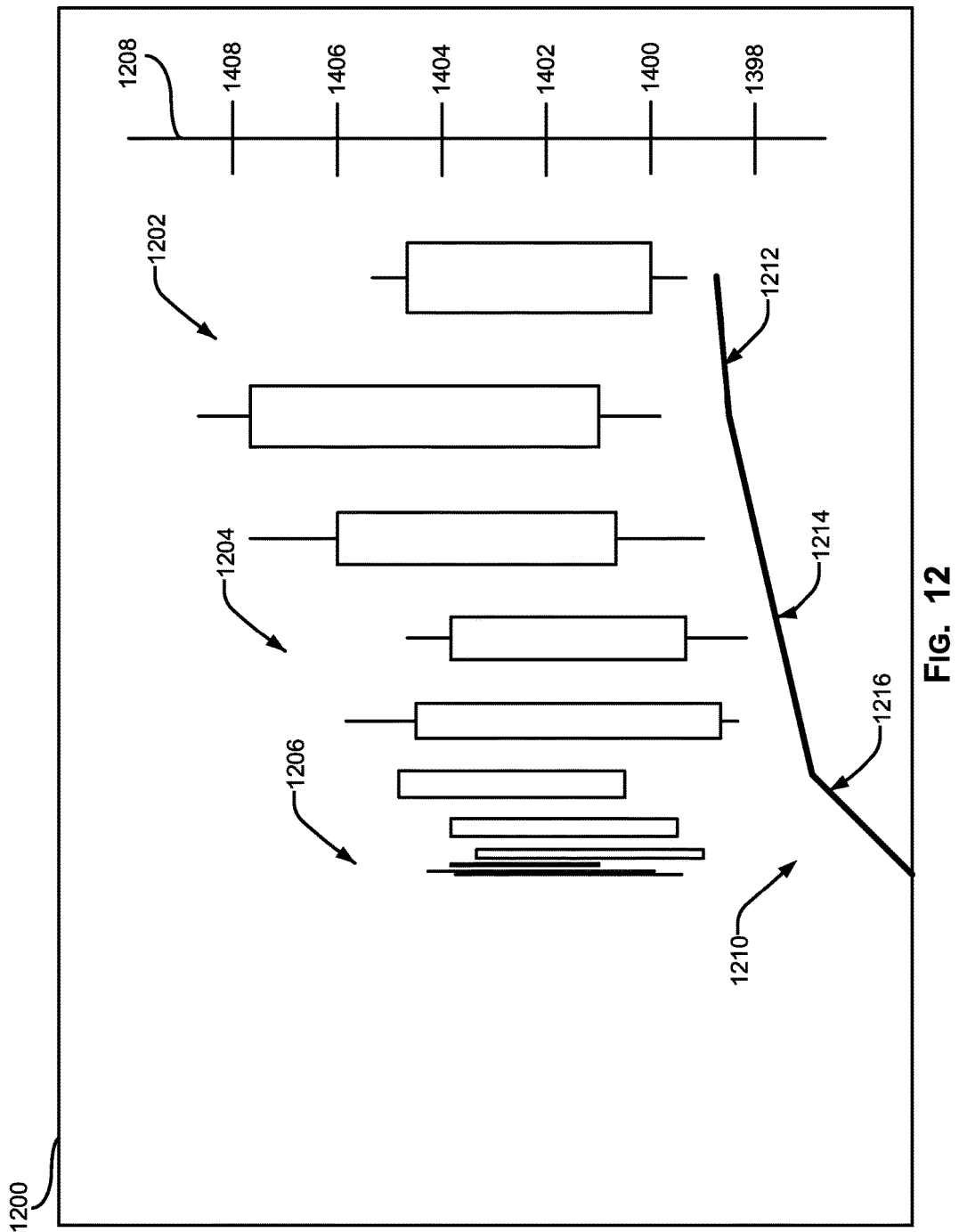
FIG. 12 illustrates another example variable display to chart bars and another trend line with variable scaling and/or aggregation.

FIG. 12 illustrates another example variable display 1200. The variable display 1200 may be generated by a tradeable object variable display module executed by, for example, the processor 312. In the illustrated example, the variable display 1200 displays a plurality of aggregated tradeable object bars 1202, 1204 and 1206. The plurality of aggregated tradeable object bars 1202, 1204 and 1206 relate to a tradeable object. The plurality of tradeable object bars 1202, 1204 and 1206 are displayed relative to an example axis 1208. Each group of aggregated tradeable object bars 1202, 1204 and 1206 are displayed according to a different scaling and/or aggregation factor. FIG. 12 further illustrates a bent trendline 1210. The bent trendline 1210 illustrates, for example, the direction in which the tradeable object's value may move over time. The bent trendline 1210 include a plurality of segments 1212, 1214 and 1216. Each of the plurality of segments 1212, 1214 and 1216 is bent according to the scaling factor applied to the plurality of tradeable object bars 1202, 1204 and 1206. For example, the group of aggregated tradeable object bars 1206 is displayed in a compressed and/or highly scaled manner. The segment 1206 of the trendline 1210 describes the trend associated with the group of aggregated tradeable object bars 1206. In particular, as the scaling factor applied to the group of aggregated tradeable object bars 1206 increases, the slope of the segment 1206 increases. Similarly, the slopes of the segments 1214 and 1216 are affected by changes in the scaling factors applied to the respective groups of aggregated tradeable object bars 1214 and 1212.

In operation, a trading application can present different types of information. For example, a trading application can include a tradeable object variable display module to present a graphical representation of market data for a tradeable object(s) in a window. In some such examples, a trader may desire the window to present additional information. As described and disclosed herein, an example variable display enables a trader to variably scale the visual representations (e.g., the tradeable object bars). For example, a width-scaling factor may be selected to variably adjust the width of each tradeable object bar, and, thereby, facilitate presenting additional information (e.g., historic market data) for the trader to process. A spatial-scaling factor may be selected to variably adjust the amount of space between consecutive tradeable object bars, and, thereby, facilitate presenting additional information (e.g., historic market data) for the trader to process. By adjusting the width-scaling factor and/or the spatial-scaling factor, the amount of information displayed (e.g., over a longer period of time) may be useful for identifying a trend between the price and the volume of the tradeable object, for example.

In some examples, an aggregation-scaling factor may be selected to variably adjust the market data aggregated into "rolled-up" bars. For example, an aggregation-scaling factor may be selected so that the most recent market data is presented in one or more one minute intervals, while older market data is "rolled-up" over longer periods of time (e.g., ten minutes, one hour, one day, etc.). By adjusting the aggregations, a longer term view of swing-highs and swing-lows of the data may be observed and processed.

Some of the described figures depict example block diagrams, systems, and/or flow diagrams representative of methods that may be used to implement all or part of certain examples. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While examples have been disclosed, various changes may be made and equivalents may be substituted. In addition, many modifications may be made to adapt a particular situation or material. Therefore, it is intended that the disclosed technology not be limited to the particular examples disclosed, but will include all examples falling within the scope of the appended claims.

What is claimed is:

1. A method comprising:
   receiving, by a computer device, market data related to a tradeable object offered at an exchange;
   aggregating, by the computer device, a first data subset of the market data for a first period;
   aggregating, by the computer device, a second data subset of the market data for a second period, the second period represents a period of time different from and before the first period;
   aggregating, by the computer device, a third data subset of the market data for a third period, the third period represents a period of time different from the first period and the second period, and wherein the third period is before the second period;
   defining, by the computer device, a first bar based on the first data subset and a first bar-width;
   defining, by the computer device, a second bar based on the second data subset and a second bar-width, wherein the second bar-width is related to the first bar-width based on a width-scaling factor, and wherein the second bar-width is based on the width-scaling factor applied to the first bar-width and is narrower than the first bar-width;
   defining, by the computer device, a third bar based on the third data subset and a third bar-width, wherein the third bar-width is related to the second bar-width based on the width-scaling factor, and wherein the third bar-width is scaled based on the width-scaling factor applied to the second bar-width and is narrower than the second bar-width;
   displaying, by the computer device, the first bar and the second bar in a window, wherein the first bar and the second bar are separated by a first bar-spacing;
   displaying, by the computer device, the third bar in the window in relation to the second bar, wherein the second bar and the third bar are separated by a second bar-spacing that is different than the first bar-spacing, wherein the second bar-spacing is related to the first bar-spacing based on a spatial-scaling factor, wherein the second bar-spacing is based on the spatial-scaling factor applied to the first bar-spacing and is less than the first bar-spacing;
   detecting a user-input control overlapping with the second bar;
   in response to the user-input control, displaying a second window in relation to the second bar;
   defining a fourth bar based on the second data subset and the first bar-width; and
   displaying the fourth bar in the second window.

2. A method as defined in claim 1, wherein a duration associated with the first period is the same as a duration associated with the second period, and the width-scaling factor is less than one.

3. A method as defined in claim 1, wherein the spatial-scale factor is less than one.

4. A method as defined in claim 1, wherein a duration associated with the second period is relative to a duration associated with the first period based on an aggregation-scaling factor greater than one.

5. A method as defined in claim 1, wherein the width-scaling factor or a spatial-scaling factor associated with distances between respective bars is less than one.

6. A method as defined in claim 1, wherein the width-scaling factor and a spatial-scaling factor associated with distances between respective bars is less than one.

7. A method as defined in claim 1, wherein the second window is within the first window.

8. A method as defined in claim 1, wherein the second window overlaps the first window.

9. A method as defined in claim 1, wherein when values of the first data subset are a subset of the second data subset, the second bar consumes the first bar.

10. A method as defined in claim 1, wherein when values of the first data subset are not a subset of the second data subset, displaying the first bar and the second bar as distinct bars in the window.

11. A method as defined in claim 1, wherein the width-scaling factor, the spatial-scaling factor associated with distances between respective bars or an aggregation-scaling factor associated with respective periods is a sliding scale.

12. A method as defined in claim 1, wherein the width-scaling factor, the spatial-scaling factor associated with distances between respective bars or an aggregation-scaling factor associated with respective periods is logarithmic.

13. A method as described in claim 1, wherein the market data includes an open-value, a high-value, a low-value and a close-value.

14. A method as described in claim 13, wherein each bar of the first bar, second bar, and the third bar is an indicator defined based on the open-value, the high-value, the low-value and the close-value.

15. A method as described in claim 1, wherein each bar of the first bar, the second bar, and the third bar is a candlestick.

16. A method as described in claim 1, wherein each bar of the first bar, the second bar, and the third bar is a vertically-aligned market indicia.

* * * * *